(12) United States Patent
Shafi et al.

(10) Patent No.: US 7,380,068 B2
(45) Date of Patent: May 27, 2008

(54) SYSTEM AND METHOD FOR CONTENTION-BASED CACHE PERFORMANCE OPTIMIZATION

(75) Inventors: Hazim Shafi, Austin, TX (US); William E. Speight, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 11/260,555

(22) Filed: Oct. 27, 2005

(65) Prior Publication Data

US 2007/0101067 A1 May 3, 2007

(51) Int. Cl.
*G06F 13/00* (2006.01)

(52) U.S. Cl. ........................................ 711/141; 711/122
(58) Field of Classification Search ...................... None
See application file for complete search history.

(56) References Cited

U.S. PATENT DOCUMENTS 6,701,416 B1 * 3/2004 Arimilli et al. ............. 711/141
2002/0169931 A1 * 11/2002 Krick et al. ................. 711/146

* cited by examiner

*Primary Examiner*—Reginald G. Bragdon
*Assistant Examiner*—Eric S Cardwell
(74) *Attorney, Agent, or Firm*—Casimer K. Salys; Dillon & Yudell LLP

(57) ABSTRACT

A data processing unit, method, and computer-usable medium for contention-based cache performance optimization. Two or more processing cores are coupled by an interconnect. Coupled to the interconnect is a memory hierarchy that includes a collection of caches. Resource utilization over a time interval is detected over the interconnect. Responsive to detecting a threshold of resource utilization of the interconnect, a functional mode of a cache from the collection of caches is selectively enabled.

4 Claims, 6 Drawing Sheets

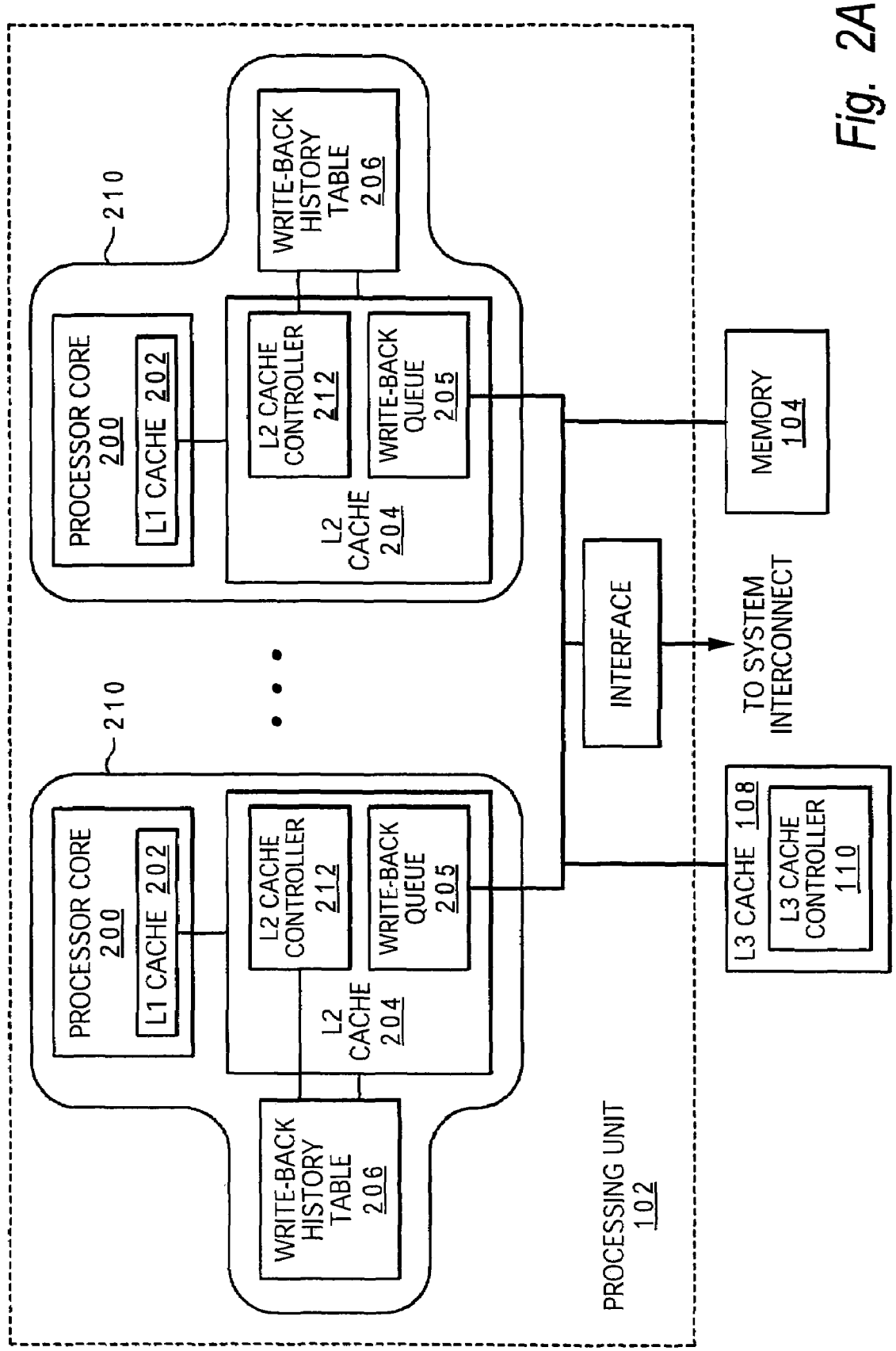

SYSTEM AND METHOD FOR CONTENTION-BASED CACHE PERFORMANCE OPTIMIZATION

This invention was made with U.S. Government support under DARPA HPCS Program Phase II, contract NBCH3039004. THE U.S. GOVERNMENT HAS CERTAIN RIGHTS IN THIS INVENTION.

BACKGROUND OF THE INVENTION

1. Technical Field

The present invention relates in general to data processing systems, and more particularly, to an improved multi-processor data processing system. Still more particularly, the present invention relates to improved cache operation within multi-processor data processing systems.

2. Description of the Related Art

A conventional multi-processor data processing system (referred hereinafter as an MP), typically includes a system memory, input/output (I/O) devices, multiple processing elements that each include a processor and one or more levels of high-speed cache memory, and a system interconnect coupling the processing elements to each other and to the system memory and I/O devices. Though most multi-processor systems utilize a unified system memory and common bus type interconnect, generalized interconnects with non-uniform memory access (NUMA) system memory configurations are common to high performance systems. The processors all utilize common instruction sets and communication protocols, have similar hardware architectures, and are generally provided with similar memory hierarchies.

Caches are commonly utilized to temporarily store values that might be accessed by a processor in order to speed up processing by reducing access latency as compared to loading needed values from memory. Each cache includes a cache array and a cache directory. An associated cache controller manages the transfer of data and instructions between the processor core or system memory and the cache. Typically, the cache directory also contains a series of bits utilized to track the coherency states of the data in the cache.

With multiple caches within the memory hierarchy, a coherency structure (e.g., a page frame table) is required for valid execution results in the MP. This coherency structure provides a single view of the contents of the memory to all of the processors and other memory access devices (e.g., I/O devices). A coherent memory hierarchy is maintained through the utilization of a coherency protocol, such as the MESI protocol. In the MESI protocol, an indication of a coherency state is stored in association with each coherency granule (e.g., a cache line or sector) of one or more levels of cache memories. Each coherency granule can have one of the four MESI states, which is indicated by bits in the cache directory.

The MESI protocol allows a cache line of data to be tagged with one of four states: "M" (modified), "E" (exclusive), "S" (shared), or "I" (invalid). The Modified state indicates that a coherency granule is valid only in the cache storing the modified coherency granule and that the value of the modified coherency granule has not been written to system memory. When a coherency granule is indicated as Exclusive, only that cache holds the data, of all the caches at that level of the memory hierarchy. However, the data in the Exclusive state is consistent with system memory. If a coherency granule is marked as Shared in a cache directory, the coherency granule is resident in the associated cache and possibly in at least one other, and all of the copies of the coherency granule are consistent with system memory. Finally, the Invalid state indicates that the data and address tag associated with a coherency granule are both invalid.

The state to which each coherency granule (e.g., cache line or sector) is set is dependent upon both a previous state of the data within the cache line and the type of memory access request received from a requesting device (e.g., a processor). Accordingly, maintaining memory coherency in the MP requires that the processors communicate messages across the system bus indicating their intention to read or write to memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some MP systems, the cache hierarchy includes multiple levels. The level one (L1) cache is usually a private cache associated with a particular processor core in the MP system. The processor core first looks for data in the L1 cache. If the requested data block is not in the L1 cache, the processor core then accesses the level two (L2) cache. This process continues until the all levels in the cache hierarchy are referenced, before accessing system memory. Some of the cache levels (e.g., the level three or L3 cache) may be shared by multiple caches of other levels of the hierarchy (e.g., L3 cache may be shared by multiple L2 caches). Generally, as the size of a cache increases, its speed decreases accordingly. Therefore, it is advantageous for system performance to keep data in L1 and L2 caches whenever possible.

Some modern MP systems employ a victim cache approach in the upper levels of the memory hierarchy. Implementing the L3 cache memory as a victim cache enables better utilization of cache capacity. Furthermore, since the L3 cache memory does not need to store all the contents of the L2 cache memories, an L3 victim cache defines a separate data path between the processor core and system memory. This configuration can better accommodate the bandwidth requirements of multi-core processors and increased numbers of hardware-managed program threads.

Typically, when a congruence class storage location is needed in one of the L1 or L2 caches, the lines of the data to be replaced are "evicted" or written to another level cache for storage. However, in an MP system with a hierarchy having multiple separate caches, there may be several copies of the same data residing in the memory hierarchy at the same time. The policy of evicting lines to provide for more space in the L1 and L2 caches may result in unnecessary writes to other level caches, which necessitates increased bus and cache bandwidth. Invalidating the data in a needed storage location may be more efficient.

However, invalidating rather than evicting does not always result in system performance gains. Therefore, there is a need for a system and method which dynamically detects conditions in a data processing system, and the uses of that information to tailor memory hierarchy eviction and invalidation practices to maximize system performance.

SUMMARY OF THE INVENTION

The present invention includes, but is not limited to, a data processing unit, method, and computer-usable medium for contention-based cache performance optimization. Two or more processing cores are coupled by an interconnect. Coupled to the interconnect is a memory hierarchy that includes a collection of caches. Resource utilization over a time interval is detected over the interconnect. Responsive to detecting a threshold of resource utilization of the interconnect, a functional mode of a cache from the collection of caches is selectively enabled.

Detecting a threshold of resource utilization is accomplished by: storing a first value that indicates by a number of bus cycles the time interval between successive analysis of resource utilization on the interconnect, storing a second value that indicates the number of bus cycles from a start of a current measured interval, storing a third value that indicates the number of times a combined response for the interconnect is a retry during the current measured interval, storing a fourth value establishing the resource utilization threshold based upon a number of retries per time interval, and detecting resource utilization over the time interval on the interconnect by comparing the first value with the second value.

If a threshold of resource utilization is detected, a write-back data structure is selectively enabled and examined to determine whether data is present in a destination cache, in response to replacing the data in a source cache without casting out the data to the destination cache.

The above-mentioned features, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 2A is a more detailed block diagram of a processing unit in accordance with a preferred embodiment of the present invention;

DETAILED DESCRIPTION OF THE
PREFERRED EMBODIMENT

Figure 1:
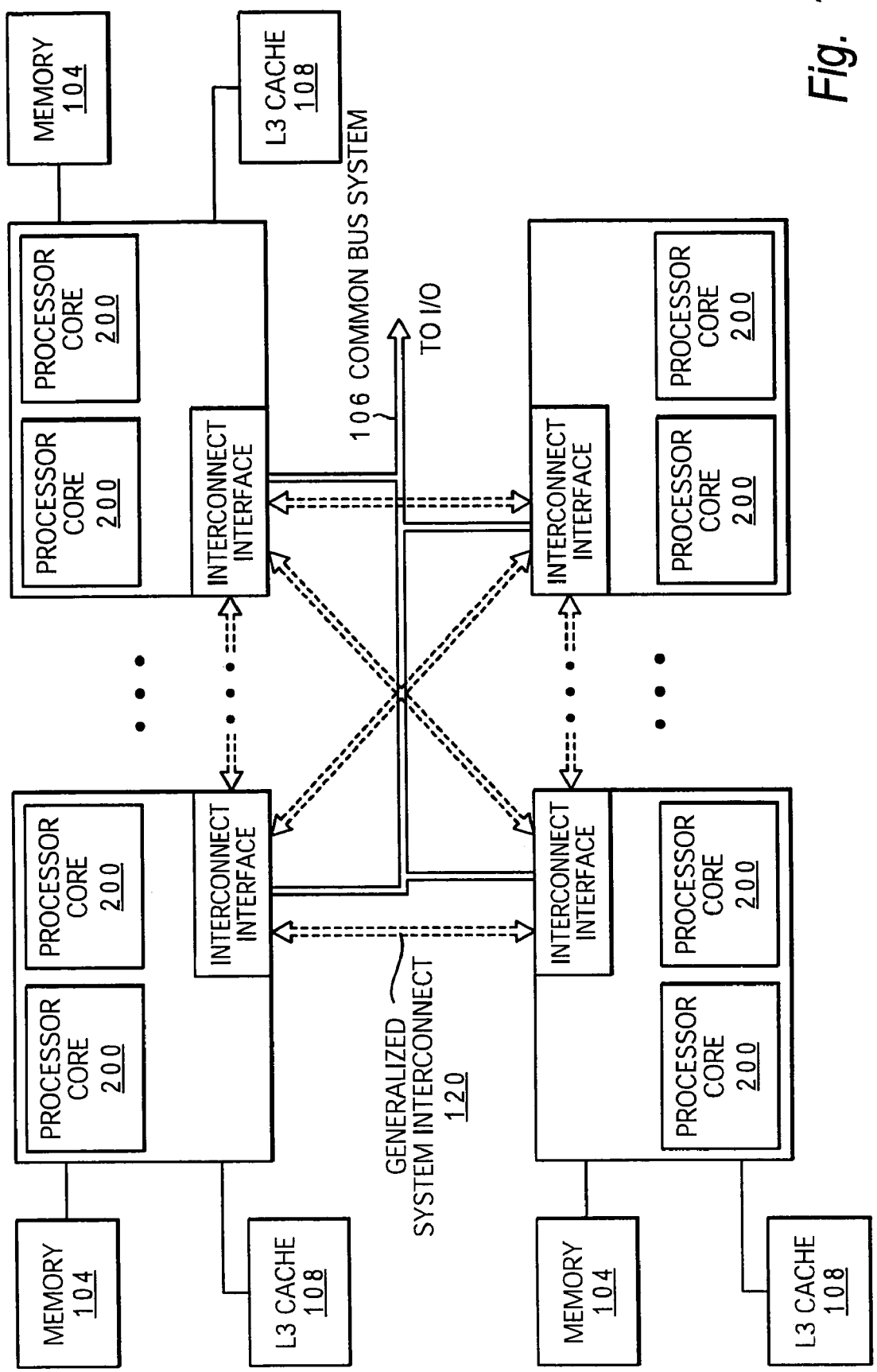
FIG. 1 is a block diagram of an exemplary multi-processor data processing system in which a preferred embodiment of the present invention may be implemented.

With reference now to the figures, and in particular, with reference to FIG. 1, there is illustrated a block diagram of a multi-processor data processing system 100 in which a preferred embodiment of the present invention may be implemented. As depicted, multi-processor data processing system 100 includes multiple processing units 102, which are each coupled to a respective one of memories 104. Each processing unit 102 is further coupled to a common bus system interconnect 106 that supports the communication of data, instructions, and control information between processing units 102. Alternate generalized system interconnect 120 illustrates that the functions of the invention are equally applicable to multi-processor systems utilizing high performance interconnect architectures. Also, L3 caches 108 are preferably coupled to processing units 102. Because of the lower latencies of cache memories as compared with memories 104, L3 caches 108 are utilized by processing units 102 as storage for recently evicted data. Each processing unit 102 is preferably implemented as a single integrated circuit comprising a semiconductor substrate having integrated circuitry formed thereon. Multiple processing units 102 and at least a portion of interconnect 106 may be advantageously be packaged together on a common backplane or chip carrier.

Those skilled in the art will appreciate that multi-processor data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to multi-processor data processing system 100 for selective write-backs in response to resource utilization provided by the present invention are applicable to data processing systems of any system architecture and are in no way limited to the specific multi-processor architectures or symmetric multi-processing (SMP) architecture illustrated in FIG. 1.

Figure 2B:
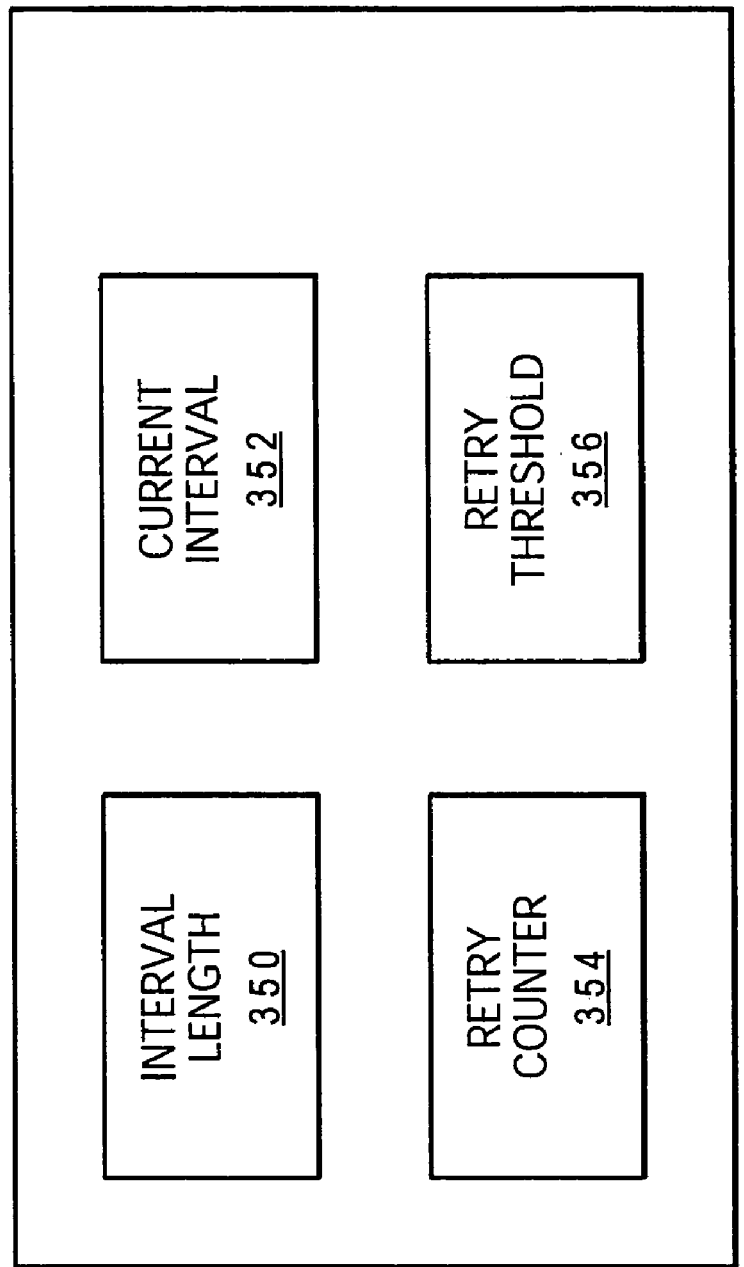
FIG. 2B is a more detailed block diagram of an L2 cache controller in accordance with a preferred embodiment of the present invention.

Referring now to FIG. 2A, there is illustrated a more detailed block diagram of a processing unit 102 in FIG. 1. As illustrated, processing unit 102 includes multiple processor cores 200, each of which includes a L1 cache 202. Coupled to each processor core 200 is a respective L2 cache 204, which further includes write-back queue 205 and an L2 cache controller 212 operable to send a write-back request to L3 cache 108 when a selected line (e.g., a victim line) is loaded into write-back queue 205. However, persons with ordinary skill in this art will appreciate that an alternate embodiment of the present invention may include multiple processor cores 200 sharing a single L2 cache 204. Also, coupled to L2 cache 204 is write-back history table 206. L2 cache controller 212 allocates an entry within write-back history table 206 if L2 cache 204 receives a message indicating that the victim line is already present in L3 cache 108. Write-back queue 205, described herein in more detail in conjunction with FIG. 3, buffers victim lines evicted from L2 cache 204. Write-back history table 206, also described herein in more detail in conjunction with FIG. 3, tracks which of the cache lines of data or instructions being evicted from L2 cache 204 are already present in L3 cache 108. Each assembly 210 of processor core 200, L2 cache 204, and write-back history table 206 is coupled by intra-chip bus-type interconnect 208 to other assemblies 210 within processing unit 102. As illustrated, L3 cache 108 includes L3 cache controller 110 and is also coupled to interconnect 208. Also illustrated in FIG. 2A is a write-back history table (WBHT) enable connection 214 that couples L2 cache controller 212 to write-back history table 206. The function of write-back history table enable connection 214 will be discussed herein in more detail in conjunction with FIGS. 2B, 3, 4, and 5.

Referring now to FIG. 2B, there is a more detailed block diagram illustrating L2 cache controller 212 implemented with L2 cache 204 in which a preferred embodiment of the present invention may be implemented. L2 cache controller 212 is coupled to write-back history table 206 via write-back history table enable connection 214. L2 cache controller 212 includes a collection of registers which are utilized to select the operating mode of write-back history table 206. As discussed in more detail in conjunction with FIG. 5, the information stored in write-back history tab12 206 is accessed by controller 212 and used to selectively inhibit the write-back of evicted lines when resources of bus 208 are under high resource utilization (e.g., there are more requests for data than resources to service those requests).

The registers included in L2 cache controller 212 are: interval length 350, current interval 352, retry counter 354, and retry threshold 356. Interval length register 350 stores a value that indicates by number of bus cycles the time interval between successive analyses of resource utilization. Those with skill in this art will understand that the value stored in interval length register 350 is a variable that may be determined by the manufacturer via values encoded in firmware, by the operating system startup, or by users after utilizing a profiling tool. Current interval register 352 stores a count indicating the number of bus cycles from the start of the current measured interval. Each time the value of the current interval register 352 equals the value stored in interval length register 350, L2 cache controller 212 derives a measure of resource utilization by comparing the values of retry counter register 354 with retry threshold register 356. Retry counter register 354 stores a value that indicates the number of times the combined response for bus 208 is a retry, during the then current measured interval.

Retry threshold register 356 stores a value establishing a resource utilization threshold based upon retries per interval. The value stored in retry threshold register 356 can be set by the manufacturer via the firmware, by the operating system at system start up, or by a user through the utilization of a profiling tool. When the value stored in retry counter register 354 equals or exceeds the value stored in retry threshold register 356 during a measured interval, L2 cache controller 212 enables write-back history table 206 via write-back history table enable connection 214 given the high resource utilization of bus 208. This process will be discussed in more detail in conjunction with FIG. 5.

In another embodiment of the present invention, L2 cache controller 212 may associate the causes of the bus combined response retries, which enables the independent tracking and valuation of the retries. For example, L3 cache 108 or one of the multiple processor cores 200 may be the dominant source of repeated retries. L2 cache controller 212 may take note of the specific causes of the retries and tailor the response of the cache hierarchy accordingly. Those with skill in this art will appreciate that the present invention is not limited to observing bus combined response retries, but may use combinations of resource utilization measures as processor cycles and bus request and/or reply transactions.

Figure 3A:
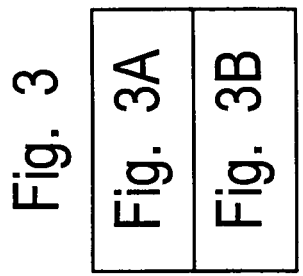
FIG. 3 is a high-level logical flowchart illustrating an exemplary cache operation in accordance with a preferred embodiment of the present invention.
Figure 3A:
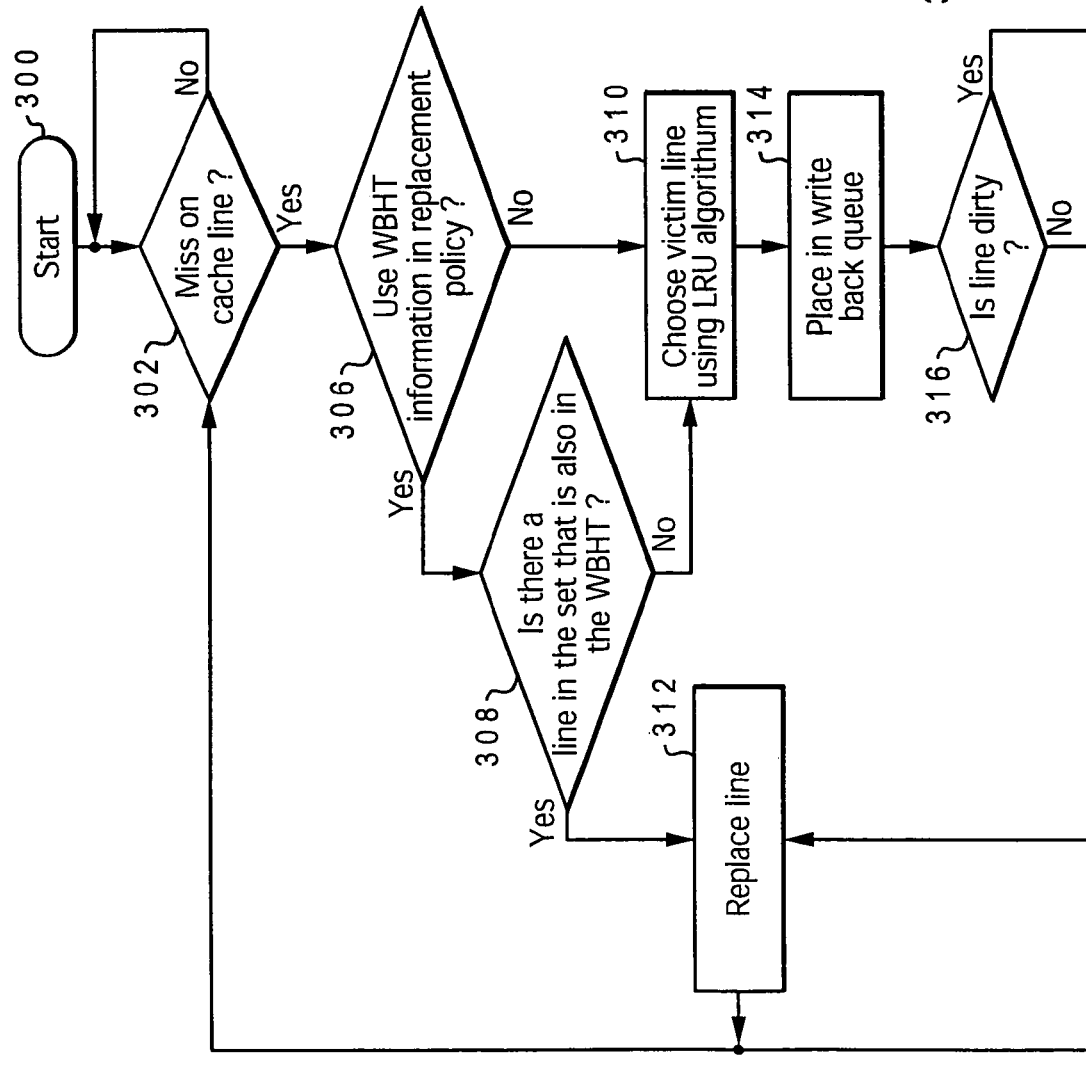
Figure 3B:
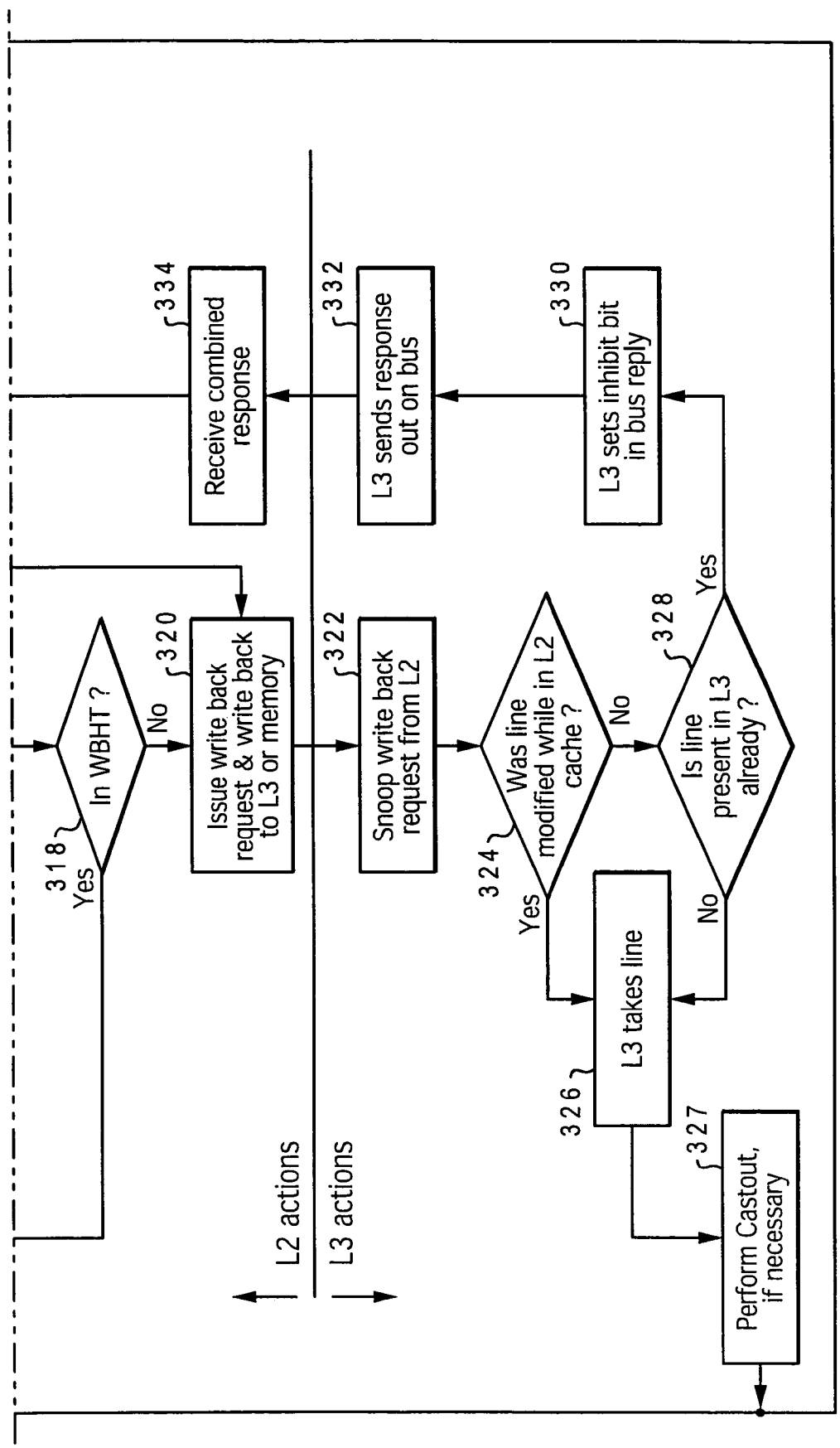

With reference now to FIG. 3, there is illustrated a high-level logical flowchart of an exemplary method of reducing unnecessary cache operations in accordance with a preferred embodiment of the present invention. The process depicted in FIG. 3 involves operations by both L2 cache 204 (top part of FIG. 3) and L3 cache 108 (bottom part of FIG. 3). The process begins at step 302, which illustrates L2 cache controller 212 determining whether or not there is a miss on a cache line in L2 cache 204 as requested by the affiliated processor core 200. If no cache miss has occurred, the process iterates at step 302.

However, if L2 cache controller 212 determines that there is a request for a cache line not in L2 cache 204, the process moves to step 306, which illustrates L2 cache controller 212 determining whether or not write-back history table information is utilized in the replacement policy. The replacement policy may be varied by code running in multi-processor data processing system 100, a hardware switch that is physically toggled by a user, or another method. If L2 cache controller 212 determines that write-back history table information is utilized in the replacement policy, the process moves to step 308, which depicts processor core 200 determining whether or not write-back history table 206 includes an entry from the same set as the cache line miss of L2 cache 204 that is also included in L3 cache 108. If processor core 200 determines that a cache line miss is both from the same set and included in L3 cache 108, by reference to write-back history table 206, the process moves to step 312. Step 312 illustrates a immediate use of the cache line in L2 cache 204, which satisfied both conditions. The process then returns to step 302, and proceeds in an iterative fashion.

Returning to step 308, if L2 cache controller 212 determines for the cache line miss that there is no cache line that is both in the same congruence class of L2 cache 204 and present in L3 cache 108, the process moves to step 310. At step 310, L2 cache controller 212 utilizes a least-recently used (LRU) algorithm or another replacement algorithm to satisfy the cache line miss. Returning to step 306, if L2 cache controller 212 determines that write-back history table information is not to be utilized in the replacement policy, L2 cache controller 212 also selects an L2 victim cache line, as depicted in step 310, utilizing the LRU replacement policy.

At step 314, L2 cache controller 212 places the selected L2 victim line into write-back queue 205. The process then proceeds to step 316, which depicts L2 cache controller 212 determining whether or not the selected L2 victim line is dirty. Many data processing systems, including exemplary multi-processor data processing system 100, preferably utilize a coherency protocol, like the MESI protocol. For example, a dirty cache line is considered a Modified granule that is valid only in the cache storing the modified coherency and that the value of the modified coherency granule has not been written to memory 104 or any other type of data storage device (e.g., CD-ROM, hard disk drive, floppy diskette drive or others). A clean line may be marked with an Exclusive or Shared tag. If L2 cache controller 212 determines the selected L2 victim line is dirty, the process continues to step 320, which illustrates L2 cache 204 issuing a write-back request to L3 cache 108. However, if L2 cache controller 212 determines the selected L2 victim line is not dirty, the process continues to step 318, which depicts L2 cache controller 212 examining the contents of write-back history table 206 for an entry that indicates the selected L2 victim line is also present in L3 cache 108. If L2 cache controller 212 determines the selected L2 victim line is also present in L3 cache 108, the process then proceeds to step 312, which illustrates L2 cache controller 212 replacing the selected L2 victim line without first writing the selected victim line to L3 cache 108 or memory 104. The process then returns to step 302 and continues in an iterative fashion.

Returning to step 318, if processor core 200 determines by reference to write-back history table 206 that the selected victim is not present in L3 cache 108, the process continues to step 320. If L2 cache controller 212 determines that the information stored in write-back history table is not used in the replacement policy (step 306), the process transitions directly from step 316 to step 320, bypassing step 318. The process continues to step 322, which depicts L3 cache controller 110 snooping a write-back request issued from L2 cache 204. The process then continues to step 324, which illustrates L3 cache controller 110 determining whether or not the selected L2 victim line had been modified while present in L2 cache 204. If L3 cache 108 determines that the selected L2 victim line had been modified while present in L2 cache 204, the process continues to step 326, which depicts L3 cache 108 accepting the selected L2 victim line from L2 cache 204. If the selected L2 victim line was modified while present in L2 cache 204, L3 cache 108 must accept and cache the selected L2 victim line in order to preserve the changes made to the selected L2 victim line while present in L2 cache 204. The process then continues to step 327, which illustrates L3 cache 108 performing a castout of a data line from L3 cache 108 according an algorithm such as a least recently used (LRU) algorithm. The process then returns to step 302 and proceeds in an iterative fashion.

When a selected L2 victim line has not been modified while present in L2 cache 204, L2 cache 204 first examines the contents of a write-back history table 206 to determine if the selected L2 victim line is already present in L3 cache 108.

It is possible that when processor core 200 initially requests and processes a cache line, the line is written to only L1 cache 202 and L2 cache 204. The line is not written to lookaside L3 cache 108 until L2 cache 204 casts out a line to make room for a new data line requested by processor core 200. Therefore, each time a clean (not modified) line is selected to be cast out of L2 cache 202, L2 cache 202 must examine write-back history table 206 to determine whether or not a copy of the selected L2 victim line is already present in L3 cache 108. If an entry in write-back history table 206 indicates that a copy of the L2 selected victim line is already present in L3 cache 108, which serves as a castout or victim cache, casting out the selected L2 victim line to L3 cache 108 would be an unnecessary function.

Therefore, returning to step 324, if L3 cache 108 determines that the selected L2 victim line has not been modified while present in L2 cache 204, the process continues to step 328, which illustrates L3 cache 108 determining whether or not the selected L2 victim line is already present in L3 cache 108. If L3 cache 108 determines that the selected L2 victim line is not already present in L3 cache 108, the process continues to step 326, which depicts L3 cache 108 accepting the selected L2 victim line received from L2 cache 204. This process is not necessary to preserve a copy of the selected L2 victim line since the data in the selected L2 victim line in L2 cache 204 also resides in memory 104, but is advantageous for latency purposes. Then, if L3 cache 204 is filled with castout lines from L2 cache 204, a data line from L3 cache 204 must be cast out, preferably to memory 104, to accommodate the selected L2 victim line from L2 cache 204. Therefore, the process then continues to step 327, which illustrates L3 cache 108 casting out a data line to accommodate the selected L2 victim line from L2 cache 204, if necessary. The process then returns to step 302 and continues in an iterative fashion.

Returning to step 328, if L3 cache 108 determines that the selected L2 victim line is valid in L3 cache 108, the process continues to step 330, which illustrates L3 cache 108 setting an inhibit bit in the response to the write-back request from L2 cache 204. Setting the inhibit bit indicates to L2 cache 204 that the selected L2 victim line is already present in the L3 cache 108 and that L2 cache 204 may replace the selected L2 victim line with newly-requested data without casting out the selected L2 victim line to L3 cache 108. Persons with ordinary skill in this art will appreciate that an actual inhibit bit is not required to be set by L3 cache 108. L3 cache 108 may achieve the same result by sending an alternate bus response that indicates the validity of the selected L2 victim line in L3 cache 108.

The process then continues to step 332, which depicts L3 cache 108 sending the response with the inhibit bit set out on interconnect 208. The process proceeds to step 334, which illustrates L2 cache 204 receiving the response from all devices snooping interconnect 208. The process then continues to step 336, which depicts L2 cache 204 determining whether or not the response includes an inhibit bit set by L3 cache 108. If L2 cache 204 determines that the response includes an inhibit bit set by L3 cache 108. The process then moves to step 338, which illustrates L2 cache 204 allocating an entry in write-back history table 206 indicating that the corresponding line is known to be valid in L3 cache 108. If L2 cache 204 determines that write-back history table 206 is full, least recently accessed entries in write-back history table 206 are merely overwritten when L2 cache 204 allocates a new entry in step 338.

On the next cycle of the process, if the same L2 victim line is considered as a candidate for cast out from L2 cache 204, L2 cache 204 will determine per step 308 that the line is valid and present in L3 cache 108 by locating the entry in write-back history table 206 and will evict the selected L2 victim line without attempting to write-back the selected L2 victim line to L3 cache 108 or memory 104. The process then returns to step 302 and proceeds in an iterative fashion.

However, returning to step 336, if L2 cache 204 determines that the response does not include an inhibit bit set by L3 cache 108, the process continues to step 340, which illustrates L2 cache 204 ignoring the response sent by L3 cache 108. The process then returns to step 302 and continues in an iterative fashion.

While it is at times advantageous to reduce the number of clean cache line write-backs to large off-chip L3 victim caches, this reduction primarily is beneficial when the system resource utilization, primarily interconnect 208 bus traffic, exceeds a predetermined value. At lesser levels of system resource utilization, accessing of the write-back history table may degrade system performance. The present invention provides a system and method for selectively utilizing a write-back history table in response to system resource utilization. This determination of system resource utilization can be accomplished by observing the number of bus request retries for a predetermined period of bus cycles. If the number of bus request retries for a predetermined period of bus cycles exceeds a predetermined value, the system is determined to be under high-resource contention. In response to this determination, per step 306, the system enables the use of write-back history table 206.

Figure 4:
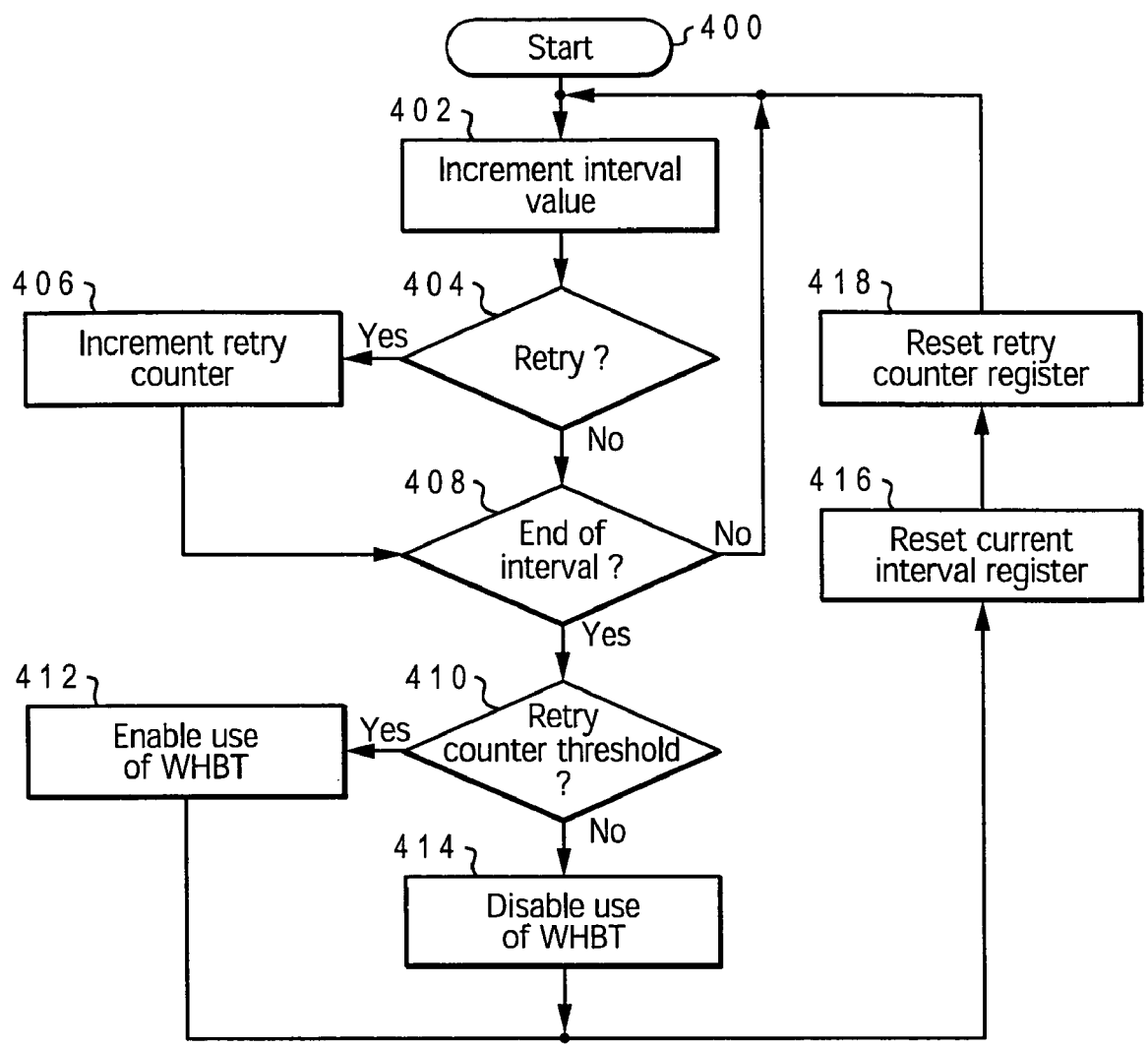
FIG. 4 is a high-level logical flowchart illustrating an exemplary method of selecting the operation mode of a write-back history table in accordance with a preferred embodiment of the present invention.

FIG. 4 is a high-level logical flowchart illustrating a method of contention-based cache optimization in accordance with a preferred embodiment of the present invention. The process begins at step 400 and proceeds to step 402, which depicts L2 cache controller 212 observing a combined response on bus interconnect 208, FIG. 2A, and incrementing a value stored in current interval register 352, FIG. 2B. The process continues to step 354, which illustrates L2 cache controller 212 determining if the combined response observed on bus interconnect 208 discussed in step 402 was a bus access request retry. If the observed combined response is a bus access request retry, the process proceeds to step 406, which depicts L2 cache controller 212 incrementing the value stored in retry counter register 354. The process the continues to step 408. Returning to step 404, if L2 cache controller 212 determines that the observed bus interconnect combined response is not a bus access request retry, the process continues to step 408.

Step 408 illustrates L2 cache controller 212 determining if the end of the measuring interval has been reached. As previously discussed, the end of the measuring interval is determined by comparing the value stored in current interval register 352 with the value stored in interval length register 350. If the value stored in current interval register 352 equals or exceeds the value stored in interval length register 350, L2 cache controller 212 determines that the current interval has expired and the process proceeds to step 410. However, if the value stored in current interval register 352 is less than the value stored in interval length register 350, the current measuring interval has not concluded. The process returns to step 400 and continues in an iterative fashion.

Returning to step 410, which depicts L2 cache controller 212 determining whether the value stored in retry counter register 354 is equal to the value stored in retry threshold register 356. If the value stored in retry counter register 354 is equal to the value stored in retry threshold register 356, the process continues to step 412, which illustrates L2 cache controller 212 enabling the use of write-back history table 206, as applies in step 306 of FIG. 3, via write-back history table enable connection 214 in FIGS. 2A and 2B. In such case, L2 cache controller 212 has determined the resources at bus interconnect 208 are under high contention during the interval and, therefore, has enabled the use of write-back history table to function and inhibit the write-back of clean lines to other levels of the memory hierarchy, such as L3 cache 108. The process then continues to step 416, which illustrates L2 cache controller 212 resetting the value stored in current interval register 352. The process proceeds to step 418, which depicts L2 cache controller 212 resetting the value store in retry counter register 354. The process returns to step 400 and proceeds in an iterative fashion.

Returning to step 410, if the value stored in retry counter register 354 is not greater than or equal to the value stored in retry threshold register 356, the process continues to step 414, which depicts L2 cache controller 212 disabling the use of write-back history table 206 via write-back history table enable connection 214 in FIGS. 2A and 2B. In such case, L2 cache controller 212 has determined that the resources at bus interconnect 208 are not under high contention during the interval and has disabled the use of the write-back history table. The write-back of clean lines to other levels of the memory hierarchy are not inhibited. The process then proceeds to step 416 and continues in an iterative fashion.

As disclosed, the present invention includes, but is not limited to, a data processing unit, method, and computer-usable medium for contention-based cache performance optimization. Two or more processing cores are coupled by an interconnect. Coupled to the interconnect is a memory hierarchy that includes a collection of caches. Resource utilization over a time interval is detected over the interconnect. Responsive to detecting a threshold of resource utilization of the interconnect, a functional mode of a cache from the collection of caches is selectively enabled.

Also, it should be understood that at least some aspects of the present invention may be alternatively implemented in a computer-readable medium that stores a program product.

Programs defining functions on the present invention can be delivered to a data storage system or a computer system via a variety of signal-bearing media, which include, without limitation, non-writable storage media (e.g., CD-ROM), writable storage media (e.g., floppy diskette, hard disk drive, read/write CD-ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    coupling two or more processing cores with an interconnect;
    implementing a memory hierarchy having a plurality of caches coupled to the interconnect; detecting resource utilization over a time interval on the interconnect by storing a first value that indicates, by a number of bus cycles, the time interval between successive analysis of resource utilization on the interconnect, storing a second value that indicates the number of bus cycles from a start of a current measured interval, and storing a third value that indicates the number of times a combined response for the interconnect is a retry during the current measured internal; and
    selectively enabling a functional mode of a cache from the plurality of caches responsive to detecting a threshold of resource utilization of the interconnect.

2. The method according to claim 1, further comprising: detecting resource utilization over the time interval on the interconnect by comparing the first value to the second.

3. The method according to claim 2, further comprising:
    incrementing the second value stored in a current interval register in response to detecting an interconnect transaction.

4. The method according to claim 1, further comprising:
    examining a write-back data structure to determine whether data is present in a destination cache, in response to replacing the data in a source cache without casting out the data to the destination cache; and
    selectively enabling the write-back data structure responsive to detecting a threshold of resource utilization on the interconnect.

* * * * *